UNITED STATES PATENT OFFICE.

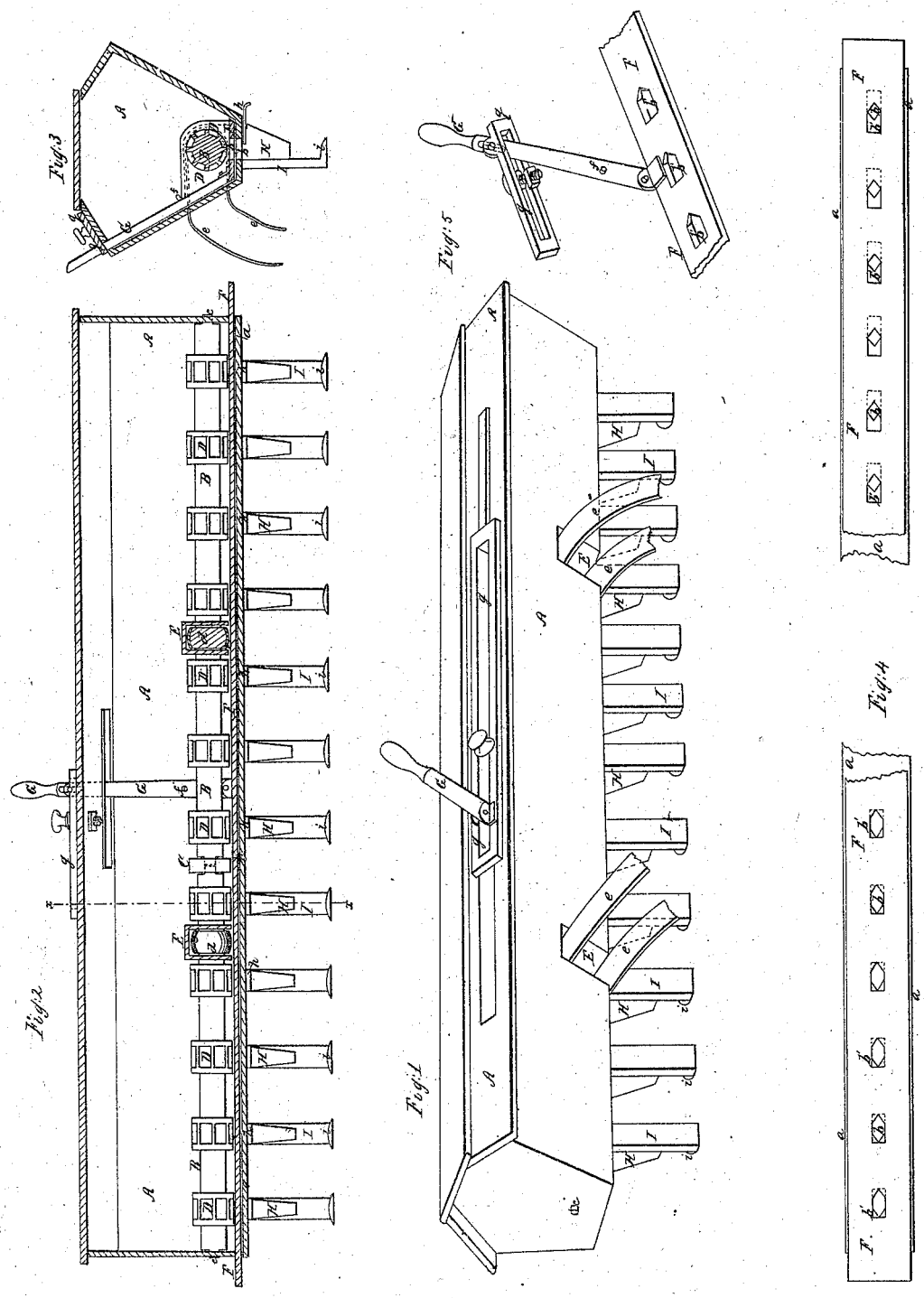

C. EGGELSTON AND D. E. EGGELSTON, OF BELOIT, WISCONSIN.

IMPROVEMENT IN SEEDING-MACHINES.

Specification forming part of Letters Patent No. 23,083, dated March 1, 1859.

*To all whom it may concern:*

Be it known that we, CARLOS EGGELSTON and DARWIN E. EGGELSTON, of Beloit, in the county of Rock and State of Wisconsin, have invented a new and useful Machine for Sowing Grain Broadcast; and we do hereby declare that the following is a full and exact description of the construction and operation of our invention, reference being had to the accompanying drawings, which make a part of this specification.

The nature of our invention consists in certain improvements in seeding-machines, as will be hereinafter fully described.

To enable those skilled to make and use our invention, we will proceed to describe the construction and operation of a machine embracing our several improvements, referring by letters to the accompanying drawings, forming part of this specification, and in which—

Figure 1 represents a perspective view of a seeding-machine embodying our improvements. Fig. 2 represents a vertical longitudinal section of the same. Fig. 3 represents a vertical cross-section at $x$ $x$, Fig. 2. Fig. 4 represents detached views of bottom and slide of hopper, and Fig. 5 a detail perspective of stop-gage and slide-lever.

Similar letters denote the same parts in the several views.

A represents the hopper, which contains the seed to be sown, which is constructed about in the usual manner, and in the bottom $a$, of which are formed a series of openings, $b$, (which will be presently particularly described,) through which the seed is discharged to the seed-spouts.

B is the feed-roller or shaft, which is made in two parts, the outer ends of each being supported and rotating in suitable bearings at $c$ in the ends of the hopper A, their adjacent ends being supported in a stand or double journal-box, C, near the center of the hopper. On said shafts B are arranged at suitable distances apart sets of longitudinal grooves or seed-pockets D, and between any two of said sets on each of the shafts B are also arranged (at such distance apart as may be deemed expedient) two pulleys, $d$, which are kept out of contact with the contents of the hopper by means of wheel-houses or incasements E, which open out one side of the hopper and surround the said pulleys closely enough only to allow of the free passage of the driving-belts $e$, which connect each of said pulleys with the limb of one of the wheels which carry the machine.

E is the slide-bar, in which are formed a series of openings, $b'$, corresponding to those made in the bottom of the hopper, and which is operated by means of a hand-lever, G, which is hung upon a pivot, $f$, in one side of the hopper A, and has its motion regulated by an adjustable stop-plate or gage, $g$.

H are a series of discharge-pipes, which are arranged one under each of the openings in the bottom of the hopper, and which are furnished severally with stops or cut-off plates $h$. In the rear of and adjacent to each of the said discharge-pipes is a stand, I, running down to within a suitable distance of the guard, and on the bottom of each of said stands or legs is secured a distributer, $i$. This distributer is convex in its upper surface, partaking of the shape of a segment of a sphere.

It will be seen by reference to Fig. 4 that the openings $b$ in the bottom of the hopper and those, $b'$, in the slide-bar F are pointed or triangular at one end, so that when the slide is moved to partially cut off the flow of seed the aperture formed is nearly square, as at $b^2$, Fig. 4.

By arranging in each of the pipes or spouts H a cut-off, $h$, any number of the said spouts may be rendered ineffectual at pleasure, and the machine thus be made to sow a width as much less than its capacity as circumstances may require. One particular division of the machine's capacity in this respect may be made by throwing off one of the driving-belts $e$, when only one portion of the shaft B will deliver seed to the openings $b$, while the capacity of said openings is regulated at pleasure by shipping the lever G, which moves the slide-bar F, and thus the quantity of seed to be sown determined.

The operation of our improved seeding-machine will be understood readily from the following explanation, after what has been said of its construction.

The apparatus illustrated and constructed as described being suitably connected to or furnished with wheels and other proper mechanism for conveying it over the field, the hopper A is filled with the seed to be sown, and (if desired to use the machine to its fullest capacity) the belts $e$ are passed over the hubs of the wheels carrying the apparatus, (or other pulleys,) the slides $h$ pulled out to admit of the free passage of the grain through the spouts H, and the openings $b'$ in the slide F adjusted over the openings $b$ in the bottom of the hopper. Then as the machine is drawn over the field the seed in the hopper is fed continually to the openings $b$ $b'$ by the revolving seed-pockets D, which are arranged on and rotate with the shaft B, through which openings it continually passes down through the spouts H, and, falling upon the convex surface of the distributers $i$, is scattered over the surface of the ground. The quantity of seed to be sown while the machine is passing over a given area is regulated by the adjustment of the slide F, (changing the capacity of the openings $b$ $b'$,) which adjustment is effected by the shipper G, as before described. Any number of the spouts H may have their supply of seed cut off at pleasure by means of the cut-offs $h$, and one-half or one given division of the machine alone may be used by "throwing off" one of the belts $e$.

It will be then seen from what has been said of our improvements that a seeding-machine embodying them embraces many advantages over those in use, and is not complicated in its construction.

Having described the construction and operation of our several improvements, what we claim as new, and desire to secure by Letters Patent, is—

1. The arrangement, in the manner and for the purposes herein described, of the rotating shaft B in two or more parts, driving-pulleys $d$, pulley-incasement E, seed-pockets D, stationary perforated bottom piece, $a$, adjustable slide F, and cut-offs $h$.

2. In combination with the above, the shipper G and adjustable slide bar or gage $g$, when the shipper is pivoted to the gage to operate as specified, for the purpose described.

CARLOS EGGELSTON.
DARWIN E. EGGELSTON.

In presence of—
E. P. KING,
P. JOHNSON.